(12) United States Patent
Myerscough-Jackopson et al.

(10) Patent No.: US 12,033,278 B2
(45) Date of Patent: Jul. 9, 2024

(54) METHOD FOR GENERATING A 3D MODEL

(71) Applicant: RESMED SENSOR TECHNOLOGIES LIMITED, Dublin (IE)

(72) Inventors: Peter John Myerscough-Jackopson, Oxford (GB); Leonardo Rubio Navarro, Oxford (GB)

(73) Assignee: ResMed Sensor Technologies Limited (IE)

( * ) Notice: Subject to any disclaimer, the term of this patent is extended or adjusted under 35 U.S.C. 154(b) by 50 days.

(21) Appl. No.: 17/796,475

(22) PCT Filed: Jan. 29, 2021

(86) PCT No.: PCT/EP2021/052199
§ 371 (c)(1),
(2) Date: Jul. 29, 2022

(87) PCT Pub. No.: WO2021/152144
PCT Pub. Date: Aug. 5, 2021

(65) Prior Publication Data
US 2023/0144111 A1 May 11, 2023

(30) Foreign Application Priority Data

Jan. 31, 2020 (GB) .................................... 2001386

(51) Int. Cl.
*G06T 17/00* (2006.01)
*G06T 15/04* (2011.01)
*G06V 40/16* (2022.01)

(52) U.S. Cl.
CPC .............. *G06T 17/00* (2013.01); *G06T 15/04* (2013.01); *G06V 40/166* (2022.01)

(58) Field of Classification Search
CPC ......... G06T 17/00; G06T 15/04; G06T 17/20; G06T 7/73; G06T 2207/10028; G06T 2207/30201; G06V 40/166
See application file for complete search history.

(56) References Cited

U.S. PATENT DOCUMENTS

| 2011/0302535 A1* | 12/2011 | Clerc | .................... G06F 3/017 |
| | | | 715/848 |
| 2012/0209419 A1* | 8/2012 | Kang | .................... A61B 34/10 |
| | | | 382/128 |

(Continued)

FOREIGN PATENT DOCUMENTS

WO    2019228473 A1    12/2019

OTHER PUBLICATIONS

International Search Report and Written Opinion for Application No. PCT/EP2021/052199 dated May 25, 2021 (10 pages).

(Continued)

*Primary Examiner* — Jeffery A Brier
(74) *Attorney, Agent, or Firm* — Botos Churchill IP Law LLP

(57) ABSTRACT

A method for generating a three-dimensional model of a head including at least a portion of a face, comprising: obtaining a distance image of the head using a distance-measuring device having an imaging position, the distance image comprising for each of a two-dimensional array of distance pixels, a respective distance value indicating a distance from the measuring position to a corresponding point in a field of view of the distance-measuring device, the distance image including a face portion corresponding to the at least a portion of a face; estimating the position, relative to the imaging position, of a longitudinal axis of the model of the head based on the at least one dimension; based on the (Continued)

longitudinal axis, generating the three dimensional model of the head based on the position of the longitudinal axis.

22 Claims, 8 Drawing Sheets

(56) References Cited

U.S. PATENT DOCUMENTS

2013/0235033 A1 9/2013 Kim et al.
2015/0009209 A1* 1/2015 Shin .................... G06T 7/68
                                                    345/419

OTHER PUBLICATIONS

European Patent Office Extended Search Report for Application No. 20207033.0 dated May 19, 2021 (9 pages).
United Kingdom Intellectual Property Office Search Report for Application No. GB2001386.8 dated Jul. 15, 2020 (3 pages).
Turban, et al., "From Kinect video to realistic and animatable MPEG-4 face model: A complete framework," IEEE International Conference On Multimedia & Expo Workshops, dated Jun. 29, 2015 (7 pages).
Hsu, et al., "Development of a method for manufacturing customized nasal mask cushion for CPAP therapy," Australasian Physical and Engineering Sciences in Medicine, vol. 38, No. 4, dated Oct. 13, 2015 (pp. 657-664).
Guarnieri, et al., "A Volumetric Approach for 3D Surface Reconstruction," CIPA 2005 XX International Symposium, Dated Sep. 26, 2005 (6 pages).
Liang, et al., "3D Face Hallucination from a Single Depth Frame," IEEE, dated Dec. 26, 2014 (9 pages).
Chen, et al., "Accurate and Robust 3D Facial Capture Using a Single RGBD Camera," IEEE, dated Dec. 2013 (8 pages).

* cited by examiner

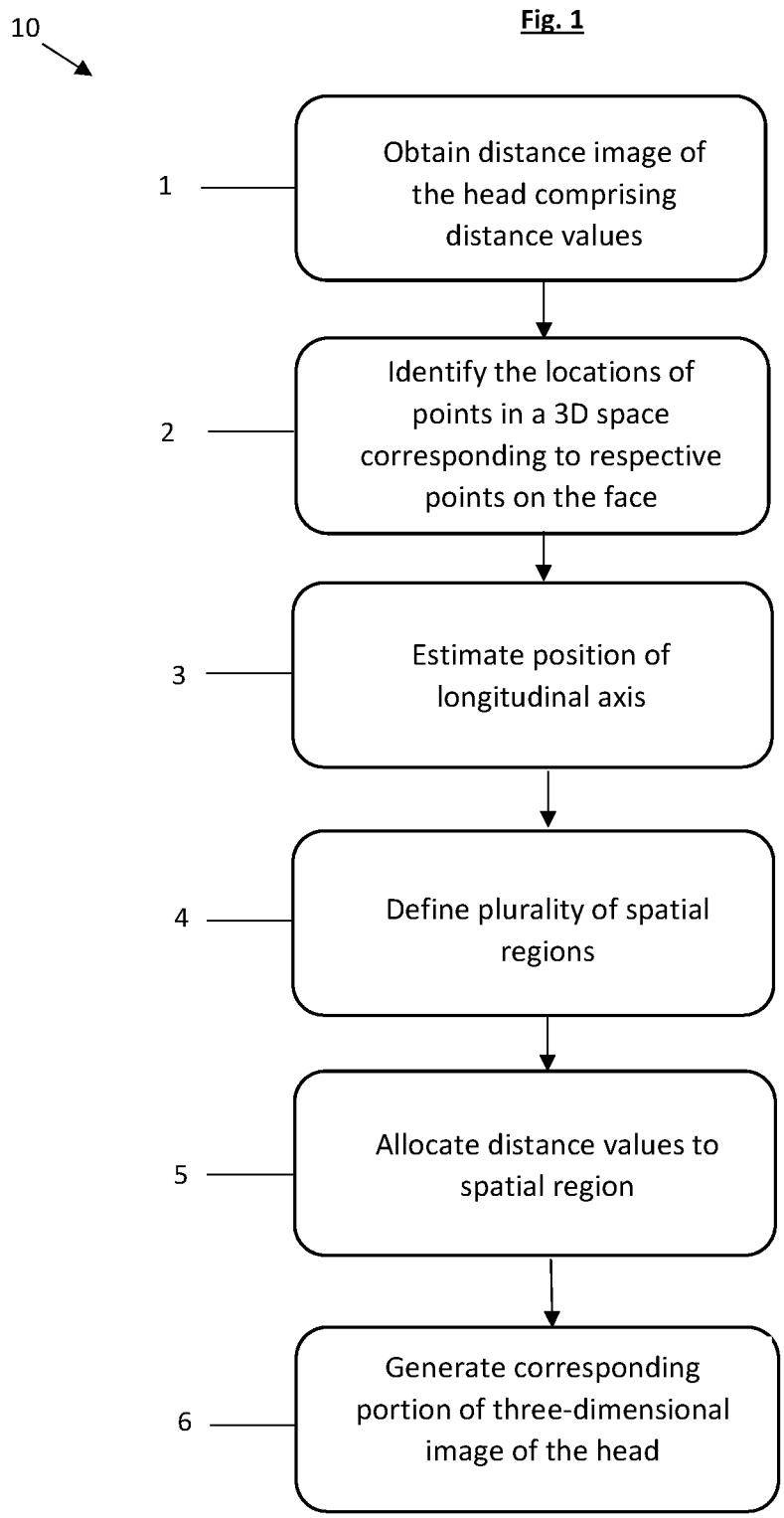

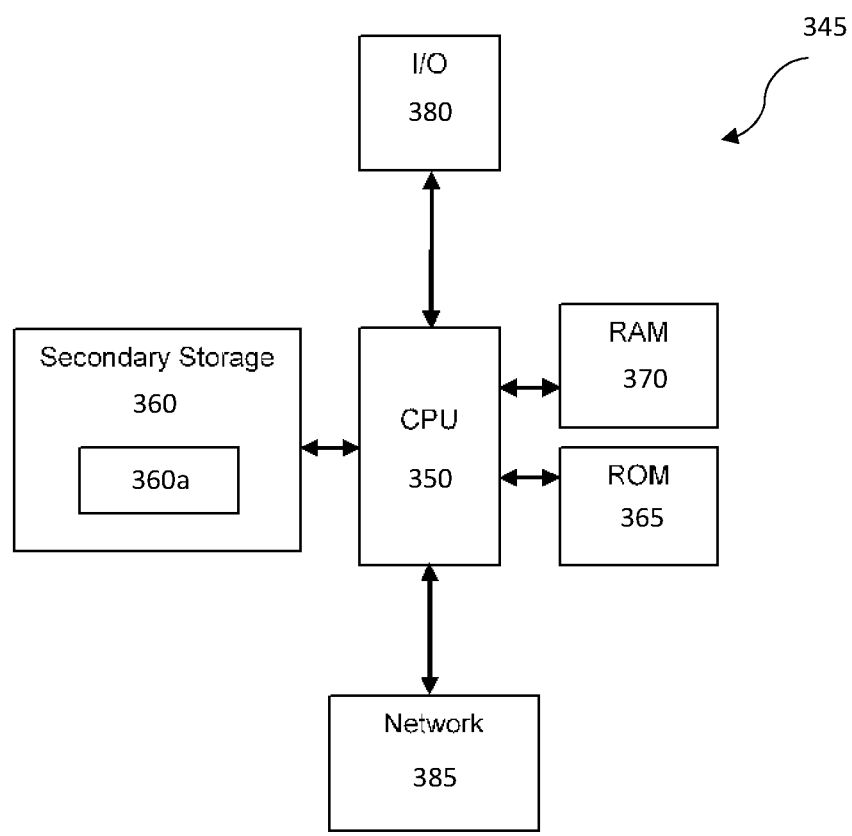

METHOD FOR GENERATING A 3D MODEL

CROSS-REFERENCE TO RELATED APPLICATION(S)

This application is a national phase entry of PCT/EP2021/052199, filed on Jan. 29, 2021, which claims priority to GB 2001386.8, filed on Jan. 31, 2020, the entire contents of each of which are fully incorporated herein by reference.

FIELD OF THE INVENTION

The present invention relates to a method, a computer program, and a system for generating a three-dimensional model of the head of a subject.

BACKGROUND

Conventional methods for generating models of a head and face of a subject require images of the head and face of the subject to be captured from multiple angles. Other methods use a single image of a face to generate a model of the head and face of a subject. Methods using a single image conventionally also use a depth sensor for generating the model. In such conventional single image methods, at positions where the sides of the head are parallel, or almost parallel, to the direction of imaging, the depth information can be unreliable and cause distortions in the model. Alternatively, other methods using a single image generate a model by fitting measurements of the face to a template, resulting in poor quality models if the face is of an unusual shape or if the image is captured whilst the subject is wearing headwear (such as headgear for online gameplay). In such methods distortions can also occur.

SUMMARY

The present invention aims to provide a new and useful method and system for generating three-dimensional models of at least part of a head (a "head model"). For example, the model may comprise a face of the head, but may omit some or all of the rear of the head.

In general terms, the present invention proposes that at least one dimension of a head (e.g. dimension(s) of the face, such as the distances between landmarks on the face) is used to generate a longitudinal axis around which the three-dimensional head model is formed.

The axis and/or the model may be formed using information which can be extracted from at least one image of the head, preferably captured from a single position (e.g. an electromagnetic radiation image, such as a visual image, and/or a distance image taken from the single position). Based on the axis, spatial regions are defined extending from the longitudinal axis, and for each of the spatial regions a corresponding part of the model is obtained from distance values of a distance image allocated to that spatial region.

The distance image is based on a plurality of distance pixels, and includes for each distance pixel a corresponding distance value indicating the distance from the single position to the corresponding point on the head.

The estimation of the longitudinal axis can use the dimensions in combination with one or more (pre-known) physiognomy ratios, to obtain an axis of the head which cannot reliably be obtained from the image(s) alone. Note that if the axis is too near to the face, or too far from the face, resolution may be lost. This is because the spatial regions will correspond to different areas on the surface of the head, and whichever side of the head is further from the axis will have lower resolution because a single spatial region will correspond to a larger region of the head surface.

Preferred embodiments of the invention make it possible to generate a three-dimensional model of the head based on a single distance image of the head, optionally using an electromagnetic radiation image, such as a visual image, an IR image, or a thermal image to help obtain the dimensions. Preferred embodiments of the invention also make it possible to generate a three-dimensional model of a head substantially without distortions in the model in the areas parallel to the direction of imaging.

Once the three-dimensional image of the head has been generated it may be refined using distance values from one or more additional distance images captured from different imaging positions. The spatial regions defined using the longitudinal axis may be advantageous to generate a refined model, as the distance values from the one or more additional distance images can be allocated to the spatial regions in a computationally inexpensive way, and the refined three-dimensional image can be generated for each spatial region using the corresponding allocated distance values of the first distance image and of the additional distance image(s).

Preferred embodiments of the invention also make it possible to generate an accurate three-dimensional model of a head using a mobile telephone as a distance measuring device, the mobile telephone being preferably a smartphone incorporating a distance measuring device, such an iPhoneX which includes an IR distance sensor. This allows for embodiments of the invention to be used in a variety of different environments. The mobile telephone preferably comprises an RGB imaging device for generating a visual image.

One application of the three-dimensional model of the head is as an avatar representing a human subject.

Another example is to produce an item of facewear, such as an item of eyewear (e.g. a set of spectacles, which may be sunglasses and/or glasses with refractive lenses) or a mask, such as for providing a gas supply to the human (e.g. if the human suffers from sleep apnoea). In one possibility, the three-dimensional model is used as input data to a design process for the item of facewear which generates design data, and the design data is input to a fabrication device which fabricates the items of facewear. Thus, it is possible using an image(s) of the face of the human to generate a high-quality personalised item of facewear. Note that in the case that the item of facewear is a pair of spectacles the arms of the spectacles may have a length which is appropriate based on the locations on the head of the ears of the human, even though typically the ears of the user may be in a location of the head which is not accurately represented in the image(s) from which the position of the longitudinal axis was generated.

In this document the term "height" is to be understood as the spinal direction of the human whose head is imaged, from the chest to the furthermost part of the head.

BRIEF DESCRIPTION OF THE DRAWINGS

A non-limiting embodiment of the invention will now be explained, for the sake of example only, with reference to the following drawings, in which:

FIG. 1 is a flow diagram outlining the steps of the embodiment;

FIG. 5 depicts a block diagram showing a technical architecture of a server used to carry out the method according to the embodiment.

DETAILED DESCRIPTION

FIG. 1 is a flow diagram showing the steps of a method (10) which is an embodiment of the present invention. The method (10) comprises a first step (1) of obtaining a distance image of a head, the distance image comprising distance values. According to the present embodiment an electromagnetic radiation image of the head, such as a visual image (e.g. an RGB (red-green-blue) colour image), a thermal image, or an IR image, may optionally also be captured. The distance image and the electromagnetic radiation image are preferably captured within 1 second of each other, more preferably between 100 milliseconds of one another, and more preferably within 65 milliseconds of each other. It is preferable that the distance image and the electromagnetic radiation image are captured from substantially the same imaging position (i.e. the spatial relationship between the imaging position and the face is substantially the same for the distance image and the electromagnetic radiation image), since although registration of the electromagnetic radiation and distance images is not necessary for the generation of the three-dimensional model, it may be useful, e.g. if the electromagnetic radiation image is used subsequently to texture (e.g. colour) the three-dimensional model, and registration may be easier if the imaging positions are the same and if the time which elapses between the capture of the images is short.

Figure 2A:
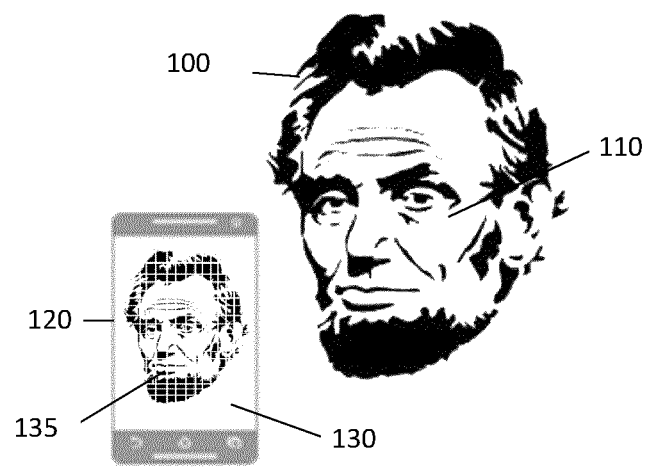
FIG. 2A is a perspective view of a step of capturing a distance image of a face using a distance measuring device in an embodiment of the invention.

FIG. 2A is a perspective view of the first step (1) of the method (10) being carried out. A distance image (130) of a face (110) belonging to the head (100) of a subject is captured using a mobile telephone (120) which functions as a distance measuring device. The distance image (130) consists of a two-dimensional array of distance pixels. Although FIG. 2A shows the distance image being displayed on the mobile telephone (120), this display is not necessary to the later steps of the method. The image is preferably captured with the distance-measuring device (120) placed directly in front of the face and with a central axis through a lens of the distance measuring (120) pointing towards the face. The distance image (130) comprises a face-portion (135), which is the portion of the distance image (130) corresponding to (i.e. depicting), at least a portion of the face (110). Below references to the "face" of the user are to be understood as meaning this portion of the face. The portion may, for example omit portions of the face at the top of the forehead. Alternatively, the face-portion may depict the entire face of the subject.

Figure 2B:
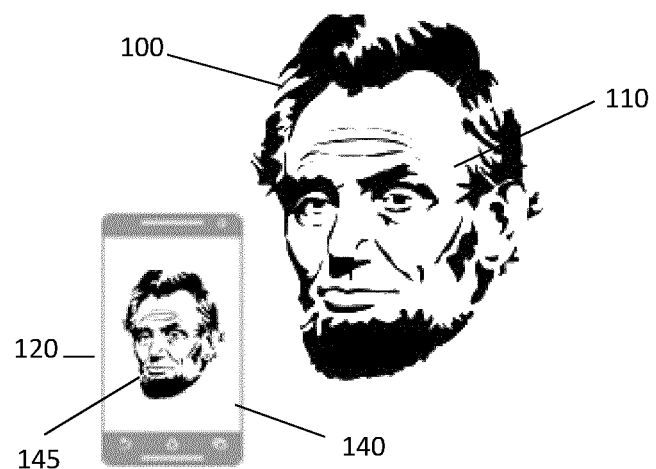
FIG. 2B is a perspective view of a step of capturing an electromagnetic radiation image of a face using the distance measuring device of FIG. 2A.

Optionally, step (1) may further include capturing an electromagnetic radiation image of the face, as illustrated in FIG. 2B which is a perspective view of an electromagnetic radiation image (140) of a face (110) belonging to the head (100) being captured by an electromagnetic radiation imaging camera of the mobile telephone (120). The electromagnetic radiation image consists of a two-dimensional array of pixels. The electromagnetic radiation image (140) is preferably captured with the mobile telephone (120) placed directly in front of the face and with a central axis through a lens of the camera of the mobile telephone (120) pointing towards the face. The electromagnetic radiation image (140) comprises a face portion (145), which is the portion of the electromagnetic radiation image (140) corresponding to (i.e. depicting) the face (110) (or, as mentioned above, depicting part of the face). The electromagnetic radiation image may be a visual image, although in principle the electromagnetic radiation image may be an IR image or a thermal image captured from infrared radiation.

Figure 3:
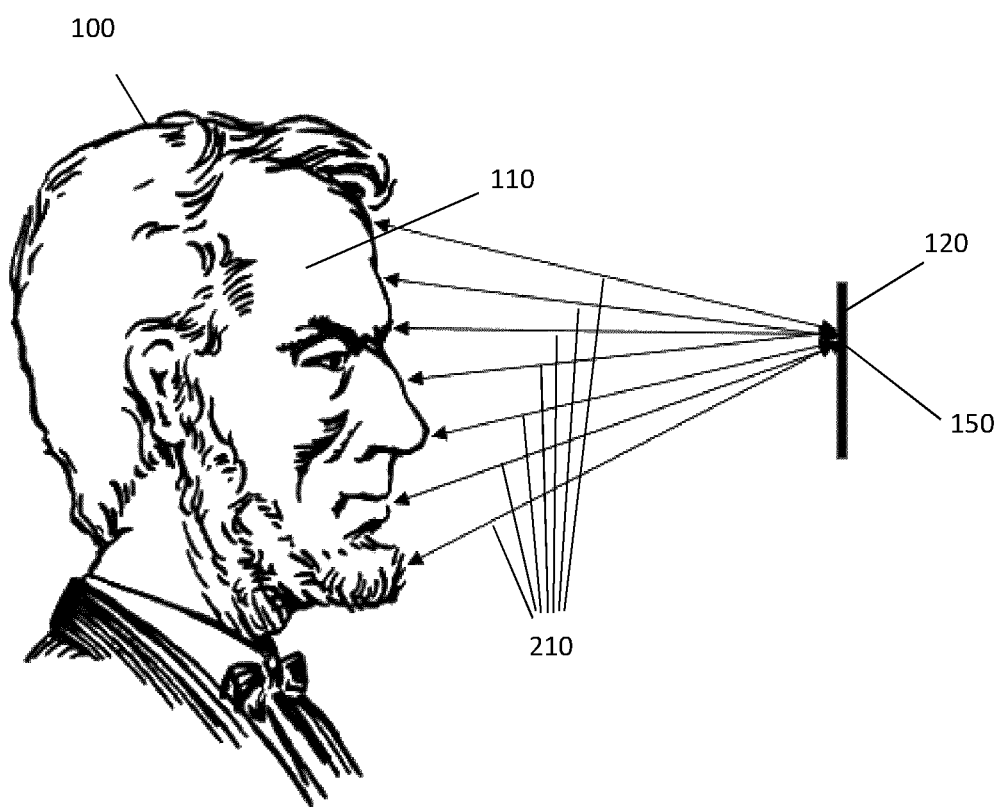
FIG. 3 is a side view of the step depicted in FIG. 2A.

FIG. 3 shows from a side view the step (1) of capturing the distance image (130), with the head (100) and the face (110) shown in profile. The distance measuring device (120) is configured to generate a set of distance values (210). The distance values (210) comprise, for each distance pixel of a face portion (135) of the distance image (130), a respective distance value (210) which is a distance of a corresponding point on the face (110) from an imaging position (150) of the distance measuring device (120). The distance measuring device (120) is preferably a handheld distance measuring device, and is more preferably a mobile telephone. An example of such a distance measuring device is an Phone X. However, the invention is not limited to this distance-measuring device (120), and the distance-measuring device (120) may be any device configured to generate a set of distance values (210). If an electromagnetic radiation image of the face is also captured by a camera of the distance measuring device (120), the camera may capture the electromagnetic radiation image (140) from the same imaging position as the imaging position (150) of the distance image.

In the second step (2) of the method (10), the locations of points in a three-dimensional space corresponding to respective points of the face are identified.

As part of this step at least one dimension of the face (110) is also identified or obtained in another way. In the first case, the dimension of the face may be identified based on the face portion (135) of the distance image (130), the face portion (145) of the electromagnetic radiation image (140), or both. Alternatively or additionally, the dimension of the face may be obtained based on data input by a user, and this is used to identify the locations of the points in the three-dimensional space. The data input by the user may include the height of the head of subject, the circumference of the head of the subject, and/or the pupil distance of the subject. The obtaining of the dimensions may be based on data retrieved from a database. The database may be a database storing data from previous scans. Further dimensions of the face (110) may also be identified.

The at least one dimension of the face (110) to be identified may comprise the distance between any two points on the face (110). These two points may be landmarks, which may be identified by a known algorithm applied to the distance image, and/or to the electromagnetic radiation image if any.

It may be assumed in step (2) that the distance image and the electromagnetic radiation image are aligned (e.g. captured from a single imaging position), such that a pre-known correspondence exists between distance pixels and pixels of the electromagnetic radiation image (for example, if the solid angles of the two images relative to the imaging position are equal, then each distance pixel will have a pre-known correspondence to a number of corresponding pixels in the electromagnetic radiation image which is equal to the ratio of the number of pixels in the respective images). Alternatively, step (2) may include an alignment sub-step in which the distance image and electromagnetic radiation images are aligned.

In one example, two points (landmarks) on the face (e.g. the eyes) may be identified in the electromagnetic radiation image by applying a known algorithm to the electromagnetic radiation image. Then the corresponding distance pixels are found according to the pre-known correspondence between distance pixels and pixels of the electromagnetic radiation image. This gives the position of the points on the face in the three-dimensional space of the distance image, and from that the dimension which is the distance between the points in that three-dimensional space may be obtained.

In a variation, the point identification algorithm may be applied directly to the distance image to find the position of the points in the three-dimensional space of the distance image. This process may optionally use pre-known dimension(s) entered by the user or obtained from the database, e.g. such that the point identification algorithm is constrained to identify the points in a manner consistent with the pre-known dimensions.

As noted above, one example of a dimension to be measured is the distance between the pupils of the eyes on the face (110). A further example of a dimension to be measured is the distance from the bridge of the nose to a point on the chin.

Another example of a dimension to be measured is the width of the face. The width of the face may be defined as the distance between two distance pixels at either respective side of the face and at a predetermined height of the face at which distance discontinuity occurs. A distance discontinuity is to be understood as a location in the distance image where the difference between the distance values (210) of two adjacent distance pixels exceeds a predetermined threshold. This occurs at the edge of the face, where one pixel measures a distance value (210) corresponding to a point on the head, and where an adjacent pixel measures a distance value (210) corresponding to a point in the background.

In the third step (3) of the method (10), a position of a longitudinal axis (320) is estimated. The estimation of the position of the longitudinal axis (320) is based on the at least one dimension of the face (110). The estimation of the position of the longitudinal axis (320) may be further based on at least one predefined physiognomy ratio. The (or each) predefined physiognomy ratio expresses a relationship, applicable to a large majority of humans, between a dimension of a human face (110) and a second, different dimension of the corresponding human head (100). For example, the ratio between the distance between the pupils of the eyes and the radius of the skull is roughly the same for most human beings. Additionally, the ratio between the width of the face, as previously defined, and the radius of the skull is roughly the same for most human beings. The step of estimating the position of the longitudinal axis (320) may be performed by multiplying the dimension of the face by the at least one predefined physiognomy ratio. Alternatively or additionally, the estimation of the position of the longitudinal axis (320) may be based on the distance value (210) corresponding to a predetermined point on the face (e.g. the distance value (210) specifying the distance between the tip of the nose and the imaging position).

The term "position" is used to mean data fully-describing the position of the axis, i.e. defining both the location and orientation of the longitudinal axis (320) (five numerical parameters are required to specify both the location and orientation of a straight line). Both the location and the orientation may be derived using the electromagnetic image, e.g. based on the identified points (landmarks) and the physiognomy ratio(s). However, in principle, other data may be used. For example, the electromagnetic image may be used to identify a single point on the longitudinal axis (320) using the physiognomy ratio, and the orientation of the longitudinal axis (320) may be determined in another way, for example so that the length direction of the axis is parallel as a predetermined direction with respect to the distance measuring device.

In principle, rather than using a physiognomy ratio, step (3) may assume that the head has a pre-known shape (e.g. included a cylindrical part) and may use the face portion (135) to obtain a radius of curvature of the cylinder, from which the axis of the cylinder can be determined. However, this approach is susceptible to error in the case of individuals having unusually shaped heads.

One or more numerical parameters (e.g. 5 parameters) specifying the position of the longitudinal axis (320) relative to the distance measuring device (120) may be estimated. The parameters are measured in relation to the axis system of the distance measuring device (120). The axis system of the distance measuring device (120) is defined in relation to the imaging position (150) of the distance measuring device (120).

Figure 4A:
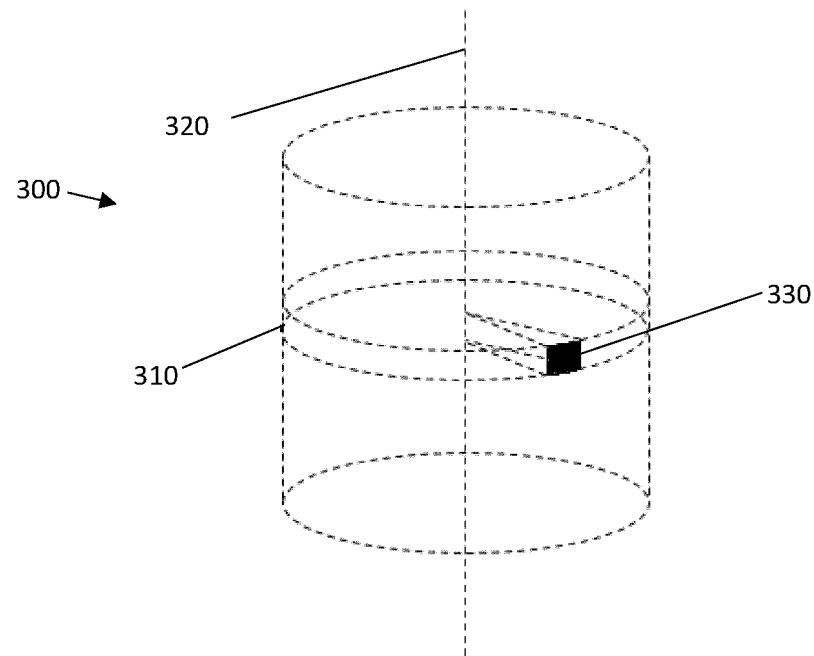
FIG. 4A depicts how a first plurality of spatial regions are defined in the embodiment of the invention.
Figure 4B:
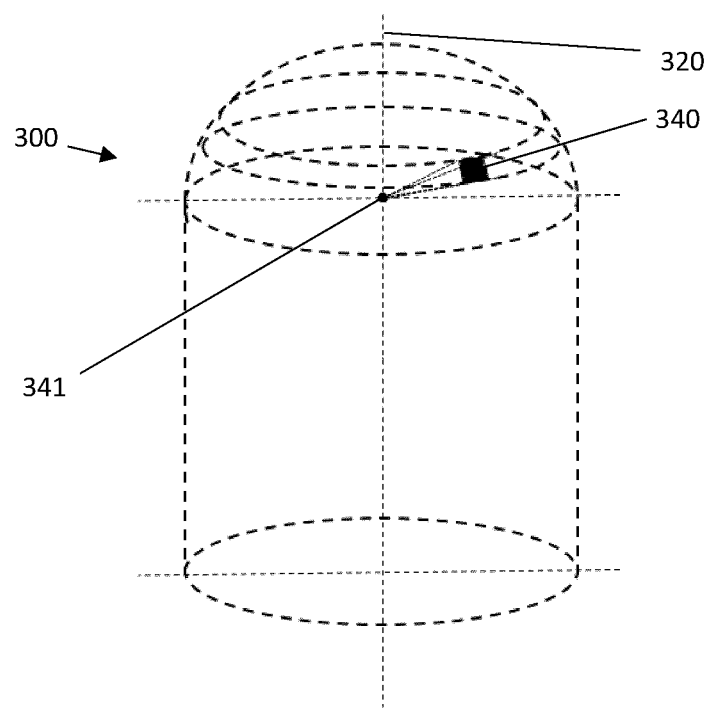
FIG. 4B depicts how a second plurality of spatial regions are optionally defined in the embodiment of the invention.
Figure 4C:
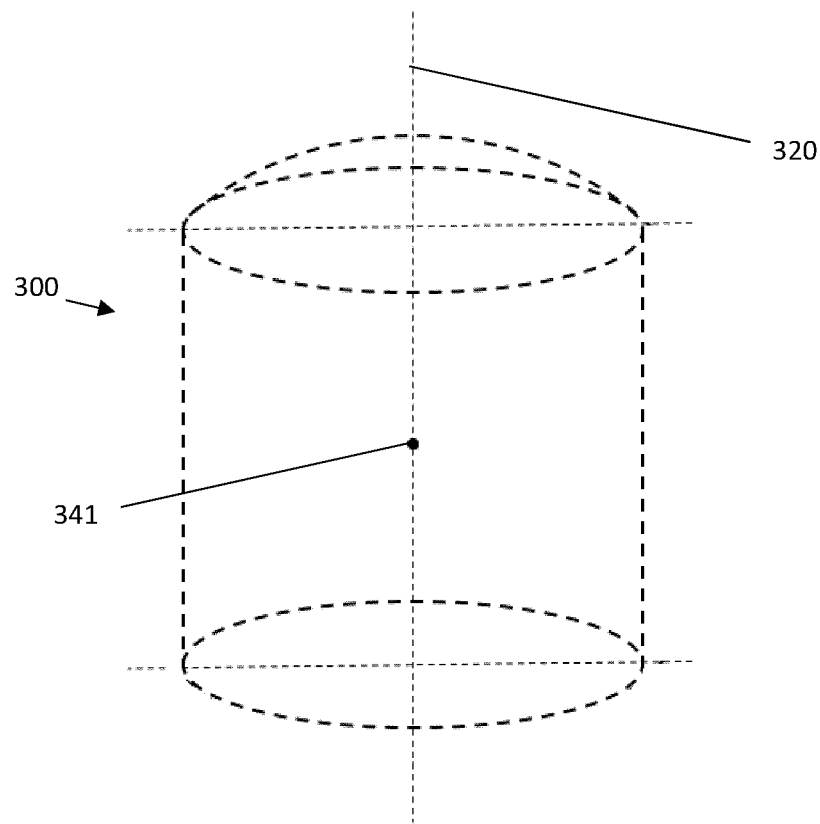
FIG. 4C depicts another way of defining the second plurality of spatial regions in a variance of the embodiment of FIG. 4B.

In the fourth step (4) of the method (10), a plurality of spatial regions (330) are defined based on the position of the longitudinal axis (320). FIGS. 4A-4C show various ways in which this can be done in the embodiment. The spatial regions (330) may be defined using polar co-ordinates, with the origin being a point on the longitudinal axis (320). This origin may be defined in relation to predetermined features of the face (110) in the distance image (130) or the electromagnetic radiation image (140), or may be defined in relation to the imaging position (150).

Firstly, FIG. 4A depicts a virtual spatial volume (300) in which there is a spatial region (330) defined in relation to the position of the longitudinal axis (320). The spatial region (330) depicted is one of a first plurality of spatial regions which extend orthogonally from the longitudinal axis. Each spatial region (330) of the first plurality of spatial regions is defined by a height value along the longitudinal axis (320). Each spatial region (330) of the first plurality of spatial regions is additionally defined by an angle, specifying the azimuthal angle between the two sides of the spatial region (330) which include the length direction of the longitudinal axis (320). FIG. 4A depicts a layer (310) having this height value, and which consists of a number of spatial regions which is equal to 360° divided by the azimuthal angle. The spatial regions of the layer (310) are equally angularly spaced around the longitudinal axis (320).

There may be a multitude of layers (310), each consisting of a plurality of spatial regions, the layers having centres at respective positions along the longitudinal axis (320) spaced apart by the height value. Note that in a variant of the model the layers (310) may not extend completely around the longitudinal axis (320) (e.g. there may a part of the head away from the face for which spatial regions are not defined) . In another variant of the model, the layers (310) may not extend to the full extent of the face (100) in a longitudinal direction (a vertical direction), but may extend so that the model corresponds to only a portion of the face (110). For example, the model may only include layers (310) corresponding a portion of the face (110) extending from the forehead to the bridge of the nose.

FIG. 4B depicts a virtual spatial volume (300) which also includes spatial regions in layers along the longitudinal axis (320). Additionally, in FIG. 4B the virtual spatial volume (300) includes a spatial region (340) defined in relation to a crown point (341) positioned along the longitudinal axis (320). The spatial region (340) depicted is one of a second plurality of spatial regions which extend from the crown point (341) at respective angles inclined to the longitudinal axis (320). The second plurality of spatial regions subtend corresponding solid angles about the crown point (341). In FIG. 4B, the crown point (341) lies on a layer which is furthermost along the longitudinal axis (320), so that the second plurality of spatial regions (340) collectively span a hemispherical solid angle about the crown point (341).

FIG. 4C depicts a virtual spatial volume (300) in which the crown point (341) is positioned on the longitudinal axis (320) near to the middle of the virtual spatial volume (300) in which the three-dimensional model of the head is to be generated. The second plurality of spatial regions collectively span a solid angle about the crown point (341) which is smaller than a hemisphere, and there are layers of the first plurality of spatial regions which lie between the crown point (341) and the second plurality of spatial regions. Preferably there is no overlap between the first plurality of spatial regions and the second plurality of spatial regions, for example by the second plurality of spatial regions not extending to the crown point (341).

In both of the cases of FIGS. 4B and 4C, step (3) of the method (10) may include estimating the position of the crown point (341). This estimation may be based upon the at least one dimension of the face (110). Additionally or alternatively it may be based upon predetermined physiognomy ratios. Additionally or alternatively it may be based upon other predetermined parameters. The position of the crown point (341) may be defined in relation to the imaging position (150). The position of the crown point (341) may be defined in relation to predetermined features of the face (110) in the distance image (130) or the electromagnetic radiation image (140). The crown point (341) may be positioned so as to be at the same height as the eye level in the distance image (130) or the electromagnetic radiation image (140). The crown point (341) may be positioned so as to be above the height of the chin in the distance image (130) or the electromagnetic radiation image (140). The crown point (341) may be positioned so as to be below the top of the head in the distance image (130) or the electromagnetic radiation image (140).

In the fifth step (5) of the method (10), the distance values (210) of the distance image (130) are allocated to corresponding ones of the spatial regions (330, 340). That is, for each distance value (210) a corresponding point in the virtual spatial volume (300) is identified, and it is determined which spatial region (330, 340) contains this point. The term "allocating a distance value to a spatial region" is here used to refer to forming a mapping either between the spatial region and the distance value in the distance image (130), or between the spatial region and the corresponding point in the virtual spatial volume (300).

In the sixth step (6) of the method (10), a portion of the three-dimensional model of the head is generated for each spatial region (330, 340) to which one or more distance values (210) have been assigned, based on the distance values (210) allocated to that spatial region (330, 340). More specifically, each portion of the three-dimensional model of the head may be generated for each spatial region (330, 340) based upon the average of the distance values (210) allocated to each spatial region (330, 340). Each portion of the three-dimensional model of the head is generated such that all of the portions of the three-dimensional model of the head collectively have a likeness to the shape of the head (100) of the subject.

Because the longitudinal axis (320) is central within the head, each of the spatial regions may be arranged to correspond to approximately the same area on the surface of the head, and thus to be imaged with a uniform resolution.

The method (10) may also involve the additional steps of obtaining additional distance images (130) of the head (100), comprising additional distance values (210), from new imaging positions (150). The additional distance values (210) may be added to the corresponding spatial regions (330,340). The portions of the three-dimensional model corresponding to the spatial regions (330, 340) to which additional distance values (210) have been added may be regenerated and/or refined based upon the additional distance values (210). For example, it is possible that in step (5), no distance values (210) were allocated to certain ones of the spatial regions defined in step (4) (e.g. because those spatial regions are far from the side of the head imaged in step (1)) so for these spatial regions no corresponding portion of the three-dimensional model may be generated in step (6). However, when the additional steps of the method are performed, distance values (210) based on the additional distance images may be allocated to these spatial regions, so that it is possible to generate a corresponding portion of the three-dimensional model.

The additional steps of obtaining additional distance values (210) and regenerating and/or refining the three-dimensional model may be repeated, with the distance measuring device (120) being at a different new imaging position (150) for each of the repetitions of the steps.

The refining of the three-dimensional model may be achieved by performing feature mapping to align an original distance image (130) and the additional distance image (130). In this process, the original distance image (130) is used to determine the position of the longitudinal axis (320), using the method described above. Features of the original distance image (130) and the additional distance image (130) that correspond to the same portion of the face (110) are then identified by performing recognition of predetermined features (landmarks) in both the original distance image (130) and the additional distance image (130). For example, the positions of the eyes may be the predetermined features. Alternatively or additionally, the tip of the nose, the position of the lips, the position of the ears, etc. may be the predetermined features. A subset of a larger set of possible predetermined features may be used as the predetermined features. The additional distance image (130) is then positioned so that the distance pixels representing the predetermined features in the additional distance image (130) are located in the same position with respect to the longitudinal axis in the three-dimensional space as the distance pixels corresponding to those same features in the original distance image (130). This process may be repeated for a plurality of additional distance images (130). Optionally, the additional distance images may be collected as the subject rotates his or her head in a horizontal plane without moving his or her body. The longitudinal axis is preferably chosen as the axis about which this rotation will occurs for a typical human.

The angle of rotation of the face (110) between the original distance image (130) and the additional distance image (130) with respect to the longitudinal axis (320) may then be calculated. For example, one or more corresponding points (landmarks) respectively in the original distance image (130) and the aligned additional distance image (130) may be compared. For each point, the angular difference about the longitudinal axis (320) between the position of the point in the original distance image and the position of the same point in the aligned additional distance image may be determined and used as the angle of rotation of the face with respect to the longitudinal axis. If more than one point (landmark) is used, the average over the multiple points (landmarks) of the angular difference for each point (landmark) is determined, and used as the angle of rotation of the face (110) about the longitudinal axis (320) between the original distance image (130) and the additional distance image (130).

Alternatively, other ways of determining the angle of rotation of the face (110) between the original distance image (130) and the additional distance image (130) may be used. For example, the angle of rotation may be calculated using the whole of the original distance image (130) and the whole of the additional distance image (130). Alternatively, portions of the distance images (130) may be used to calculate the angle of rotation, and these portions may be limited based upon features of the face in each of the distance images (130). For example, a portion of the distance image (130) may be limited to those parts of the distance image (130) corresponding to the portion of the face (110) extending from the eye brows to the upper lip in a longitudinal direction. Alternatively, the portion of the distance image (130) may be limited based upon a predetermined distance from a landmark in the face (110), such as the portion of the distance image (130) corresponding to the portion of the face (110) extending from the eye brows to a point 8 cm below the eye brows in a longitudinal direction. Alternatively, the portion of the distance image (130) may be limited based upon a predetermined ratio. For example, the portion of the distance image (130) may be limited to those parts of the distance image (130) corresponding to the portion of the face (110) extending 1.5 times the distance between the eyes below the eye brows in a longitudinal direction.

Additionally or alternatively, sub-sampling may be performed on the distance images (130) prior to calculation of the angle of rotation. Sub-sampling may be used to reduce the number of points in the distance images (130) to a desired number of points, or to reduce the number of points in the distance images (130) by a fixed sub-sampling scale factor. These methods have the benefit of reducing the computational load when calculating the angle of rotation.

Determining the angle of rotation of the face between at least two distance images (130) with respect to the longitudinal axis (320) can result in numerous advantageous features. Following the calculation of the angle of rotation of the face (110) between the original distance image (130) and the additional distance image (130), the method may further comprise determining whether the calculated angle of rotation is below a minimum threshold value. If the calculated angle of rotation is below the minimum threshold value, the additional distance image (130) may be considered to be substantially similar the original distance image (130). The additional distance image (130) may then be deleted, as is not beneficial to have two substantially similar distance images (130) used in the generation of the model. Deleting an additional distance image (130) that is substantially similar to the original distance image (130) prevents extraneous data from being stored unnecessarily.

An advantage of determining the rotation angle about the longitudinal axis (320) (rather than, for example, an axis based on the distance measuring device), is that typically all rotations of the head will be about the longitudinal axis (320), so that a single rotational value gives a good indication of how the entire face has moved. By contrast, as different points on the face have different distances from the distance measuring device, their respective rotations about the distance measuring device when the head moves are all different.

If the calculated angle of rotation is greater than the minimum threshold value, the additional distance image (130) may be considered to be substantially different to the original distance image (130). In this instance, the additional distance image (130) may be stored, as it is beneficial to use distance images (130) depicting different portions of the face (110) when generating the model.

The same process may be applied when there are multiple additional distance images (130). The angle of rotation between a first additional distance image (130) and a second additional distance image (130) with respect to the longitudinal image may be calculated. If the calculated angle of rotation is below the minimum threshold value, the second additional distance image (130) is considered to be substantially similar the first additional distance image (130), and is deleted. However, if the calculated rotation is above the minimum threshold value, the second additional distance image (130) is considered to be substantially different the first additional distance image (130), and so may be used in forming the model.

The minimum threshold value may be 2.5 degrees. The minimum threshold value may be determined based on a number of factors. A factor that may be used in determining the minimum threshold value is the amount of memory available on a computer system used to implement the method. Another factor may be the amount of computational power available on a computer system used to implement the method. For example, if the computer system used to implement the method has a small amount of memory and/or computational power available, the minimum threshold value may be comparatively larger than if the computer system used to implement the method has a large amount of memory and/or computational power available. This is because using a smaller minimum threshold values results in fewer additional distance images (130) being discarded, and so the amount of data that the computer system needs to process is increased. Another factor may be the level of detail required in the final model. For example, if a high level of detail is required in the final model, the minimum threshold value may be smaller than if a low level of detail is required in the final model.

A smaller minimum threshold value may result in a more detailed model, but will require additional computation. The minimum threshold angle may be determined based on some or all of the above factors. Additional factors may be used in the determination of the minimum threshold value, and the above described examples are not particularly limiting.

The minimum threshold value may also be dependent on the accuracy, resolution, and/or precision of the distance measuring device (120). If the distance measuring device (120) captures distance images in low resolution, for example, small differences in angle between an original distance image (130) and an additional distance image (130) may add very little information to the model, but may add a significant amount of data to be held in memory/storage and used in processing.

There may also be a maximum threshold value. This may be dependent on the alignment methods used for aligning the original distance image (130) and the additional distance image (130). For instance, two distance images (130) can only be aligned based on features that are present in both distance images (130). The less overlap there is between the two distance images (130), the greater the likelihood that errors will occur in the alignment process, affecting the quality of the final model. Therefore, when the calculated angle of rotation is above the maximum threshold value, the additional distance image (130) may be deleted. Alternatively, the additional distance image (130) may be stored, but not initially used in the model. The stored additional distance image (130) may later be used in the model if further additional distance images (130) are obtained allowing for more accurate alignment of the stored additional distance image (130) (i.e. when the angle of rotation between a first additional distance image (130) and a second additional distance image (130) is below the maximum threshold value).

Figure 4D:
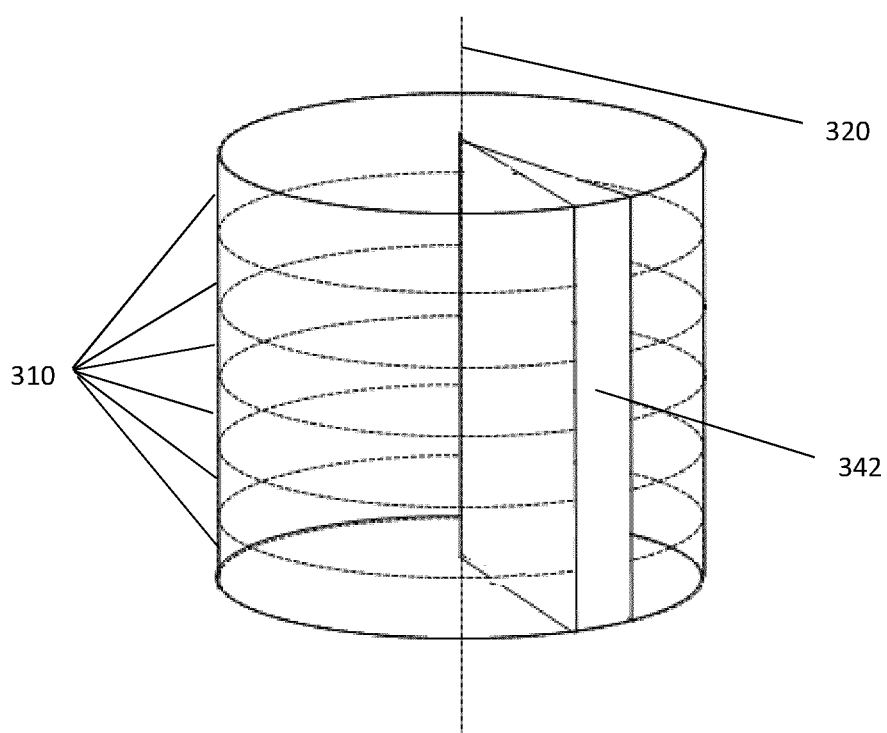
FIG. 4D depicts how a virtual spatial volume (300) can be divided into a plurality of wedges.

The method may further comprise dividing the virtual spatial volume (300) into a plurality of wedges. FIG. 4D depicts a wedge (342) formed by dividing the virtual spatial volume (300). Each wedge (342) extends perpendicularly from the longitudinal axis (330) and subtends a respective angular range about the longitudinal axis (320). The respective angular ranges of the wedges (342) may be non-overlapping, and the angular ranges may collectively span the portion of the face of the subject which is to be imaged. Each wedge (342) may also extend along the entire length of the virtual spatial volume (300) along the longitudinal axis (320), i.e. extending across the all the layers (310) of the virtual spatial volume (300). Alternatively, it may extend along only a part of the longitudinal axis (320) in the virtual spatial volume (300), e.g. the part corresponding to the portion of the face (110) which is to be imaged. Each wedge (342) may be defined by the limits of the angular range it subtends, and optionally have a defined position and extent along the longitudinal axis (320).

Note that each wedge (342) may correspond to all of the spatial regions (330) which subtend respective angular ranges about the longitudinal axis (320) which are within the angular range for the wedge (342).

The method may further comprise transmitting data to a user (the subject or another user) identifying wedges (342) for which sufficient distance data, or insufficient distance data, has so far been collected according to a sufficiency criterion. This data may be transmitted to the user by displaying an image to the user. The image may be generated based on the longitudinal axis (320).

For example, the method may comprise displaying data for each of the angles about the longitudinal axis (320) indicating those wedges from which sufficient (or insufficient) distance data has been collected according to a sufficiency criterion, e.g. by displaying respective areas on a screen corresponding to the wedges, and highlighting those of the areas for which the sufficiency criterion is (or is not) met. For example, the displayed data may indicate those wedges containing angles from which distance images (130) have (or have not) been captured (or more generally a number of distance images above a threshold). Alternatively or additionally, this data may comprise data identifying those wedges for which at least one distance value (210) has been allocated to all the spatial regions (330) (or at least a number of spatial regions (330) above a threshold). Alternatively or additionally, the data may comprise data identifying those wedges (342) for which no distance value (210) has been allocated to at least one of the corresponding spatial regions (330) (or at least to a number of spatial regions (330) above a threshold).

The display may be accompanied by a prompt to the user to capture more additional distance images (130) from those angular ranges from which insufficient distance images (130) have not already been captured.

The method may further comprise a termination process, whereby the process of repeating the steps of obtaining an additional distance image (130) and refining the three-dimensional model one or more times is terminated when termination criterion is reached. There are many possibilities for the termination criterion. The termination criterion may be based on the determination of the spatial regions for which at least one distance value (210) has been obtained. For example, it may be that the proportion of spatial regions for which at least one distance value (210) has been obtained is above a threshold. Additionally or alternatively, the termination criterion may be that the number of wedges (342) comprising at least one spatial region (330) to which at least one distance value (210) has been allocated has reached a threshold value. Additionally or alternatively, it may be based on a determined set of the wedges (342) for each of which the number of the corresponding spatial regions to which at least one distance values (210) has been allocated is above a first threshold, and the termination criterion may be that that set of wedges (342) collectively span an angular range about the longitudinal axis (320) which is above a second threshold.

Additionally or alternatively the termination criterion may be defined in relation to central distance image (130). The central distance image (130) may be a distance image taken from a position where the face (110) is directly facing the distance measuring device (120). The central distance image (130) may be identified by user input. Additionally or alternatively, the central image (130) may be identified based upon the relative positions of facial features (landmarks) in the central distance image (130). A minimum range may be defined in relation to the central distance image (130). For example, the minimum range may be 90 degrees from the central distance image (130) about the longitudinal axis (320) in each direction. The termination criterion may require that a distance image (130) is obtained every X degrees within the minimum range. Alternatively, the termination criterion may require that the angle of rotation between subsequent distance images (130) in a direction of rotation about the longitudinal axis (320) is no less than Y degrees for each distance image (130) within the minimum range. Alternatively, the termination condition may require that the distance image (130) having the greatest angle from the central distance image (130) around the longitudinal axis (320) in each direction is greater than a minimum angle Z. The values for the minimum range, and values X, Y, and Z, may be determined based on the accuracy, resolution, and/or precision of the distance measuring device (120), and the amount of available memory and/or calculation power of a computer system used to perform the method. The values for the minimum range, and values X, Y, and Z, may be determined based on the required detail of the three dimensional model. The value X may be a single value, or may represent a sub-range of the minimum range.

Figure 4E:
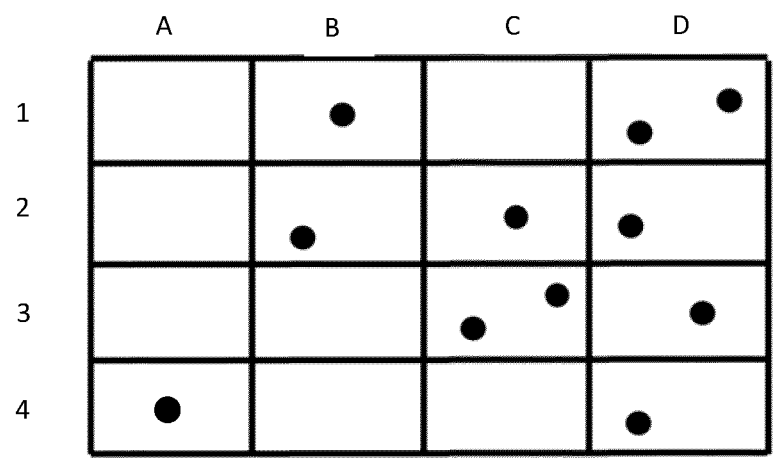
FIG. 4E depicts a two-dimensional representation of a subset of the spatial regions, indicating those to which distance values have been allotted.

The method may further comprise a process for identifying the face portion (135) of the three-dimensional model. The process may comprise determining which of the spatial regions (330) contain at least one distance value (210) obtained from at least one distance image (130). The face portion (135) can then be identified by finding the largest connected group of spatial regions (330) that each contain at least one distance value (210). Here, each spatial region (330) is considered to be "connected" to another spatial region (330) if it is adjacent to that other spatial region. FIG. 4E depicts a two-dimensional representation of a subset of the spatial regions (330). In this figure, the dots represent distance values (210) that have been assigned to each spatial region (330). The largest connected group of spatial regions (330) that each contain at least one distance value (210) comprises the spatial regions B1, B2, C2, C3, D1, D2, D3, D4. Whilst spatial region A4 contains a distance value (210), it is not connected to any of the other spatial regions (330) in the group, and so is not considered to be part of the group. Any distance values (210) which are not identified as being part of the face portion (135) may be deleted. This prevents redundant data being stored unnecessarily, and also makes it less likely that any distance values (210) which are in fact not distances to the face are inadvertently used to reconstruct the face portion of the model.

The method may also comprise a process of sense checking. This process may comprise determining whether any of the additional distance images (130) contain features of the face (110) that are incongruous. For example, if the pupil distance of the face (110) is determined to be above a pupil distance threshold value in an additional distance image (130), for example 20 cm, the additional distance image (130) will be deleted. There may be various criteria that are used for determining whether various facial features are incongruous. This process prevents erroneous data from being incorporated into the model. In another example, the sense checking process may determine whether the positions of facial features are consistent between different distance images (130). For example if the pupil distance of the face (110) is significantly smaller in a first distance image (130) than in a second distance image (130), then this may be an indication that erroneous data is present in one of the distance images (130). The sense checking process may comprise deleting distance images (130) that are determined to be erroneous by this process.

In principle the three-dimensional model of at least part of the head may be in the form of a cloud of points. More preferably, the three-dimensional model may be a surface model, comprising a defined surface, and the method (10) may also involve an additional step of defining textures of a plurality of portions of the surface of the three-dimensional model of the head based on the electromagnetic radiation image. For example, a hair like texture may be applied to the surface of the model at the portions on the surface of the model that correspond to the parts of the head that are determined in the electromagnetic radiation image to be covered by hair. The hair may be identified by a known algorithm applied to the electromagnetic radiation image.

The step of defining textures may also comprise defining colours of various parts of the model. This process can be performed when at least one electromagnetic radiation image (140) is captured. Feature mapping can be used to map the electromagnetic radiation image (140) onto a distance image (130). This may be achieved a similar way to the method explained above by which additional distance images (130) are mapped onto the original distance image (130). In the case of defining texture, the process comprises identifying at least one spatial region (330) for which distance values (210) have been allocated, and locating a sub-area of the electromagnetic radiation image (140) corresponding to that spatial region (330). The colour of the sub-area of the electromagnetic radiation image (140) is used to colour the corresponding spatial region (330) of the model.

In one form of this method, a plurality of spatial regions for which at least one distance value (210) has been allocated is identified. This plurality of spatial regions together define a portion of the surface model. For example, the plurality of spatial regions may be at the corners of a polygonal region of the surface model (e.g. at the corners of rectangle of the surface model), and, in the colouring step, points of the polygonal region of the surface model can be coloured based on the colours of corresponding points of a polygonal region of the electromagnetic radiation image (140) corresponding to the polygonal region of the surface model.

The method may comprise obtaining at least one additional electromagnetic radiation image (140), each at least one additional electromagnetic radiation image (140) being captured from a different new imaging position of the distance measuring device (120). Each electromagnetic radiation image (140) may be mapped onto the original distance image (130), or may be mapped onto an additional distance image (130) that has been mapped onto the original distance image (130). An average colour from the sub-areas of the electromagnetic radiation images (140) corresponding to the spatial regions (330) may be used to generate a low-resolution colour of the model.

The electromagnetic radiation images (140) may comprise a front image taken from directly in front of the face, a left-hand image taken from a left-hand side of the face, and a right-hand image taken from a right hand side of the face. There may be an angle of rotation of 90 degrees between the front image and the left-hand image with respect to the longitudinal axis (320), and an angle of rotation of 90 degrees between the front image and the right-hand image with respect to the longitudinal axis (320). The colours of the sub-areas of the front image, the left-hand image, and the right-hand image may be used to add high-resolution colour to the corresponding spatial regions (330) of the model.

The electromagnetic radiation images (140) may be filtered using a high pass filter to remove any chromatic aberrations.

Figure 4F:
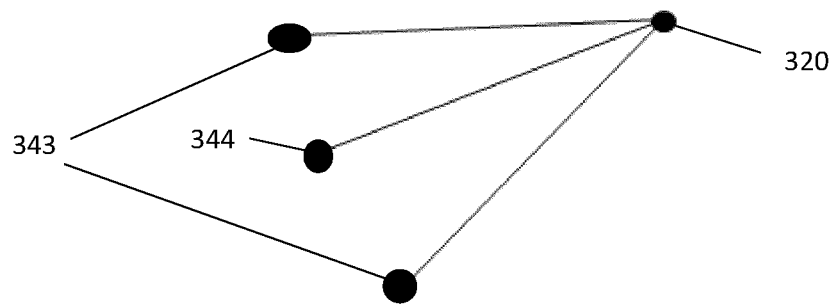
FIG. 4F illustrates how a longitudinal axis can be used to reconstruct a portion of a model for which distance data is missing.

The method may further comprise a process for estimating values for spatial regions (330) in the model to which no distance values (210) are allocated. For example, the distance values (210) may be converted into values defining a distance from the longitudinal axis (320) (using basic trigonometric techniques, for example), referred to as axis distance values. If there exists a spatial region for which no distance values are allocated, the process may comprise estimating an axis distance value for the spatial region (330) based upon the axis distance values corresponding to the adjacent spatial regions. FIG. 4F depicts the longitudinal axis (320) (which is viewed looking along its length, and thus appears as a dot) and two points (343) which have two respective axis distance values. From these axis distance values an estimated axis distance value is generated for one of the spatial regions (330) for which no distance values have been allocated, and a point (344) is shown which is within this spatial region and is at the estimated axis distance value from the longitudinal axis (320). In this example, the estimated axis distance value may be the average value of all of the axis distance values allocated to the adjacent spatial regions (330). The estimated axis distance value for the spatial region for which no distance values have been allocated may be converted into an estimated distance value, i.e. an estimated distance from the imaging point, and may be allocated to the spatial region (330) for which no distance values (210) have been allocated. Alternatively, the estimated axis distance value may be used to define a point (344) in the virtual spatial volume (300), and this point may be allocated to the spatial region (330) for which no distance values (210) have been allocated. This method of estimating axis distance values to generate points (344) to be allocated to spatial regions (330) has the benefit that it takes into account the generally cylindrical shape of a head. As can be seen in FIG. 4F, the point (344), which is spaced from the axis 320 by the estimated axis distance value, lies on an imaginary circle (in two-dimensions) centred on the longitudinal axis (320). It may be incorporated into the head model. Although, in principle, the point 344 could instead be estimated by finding a point on a straight line between the two points (343) in a position corresponding to the unoccupied spatial region (330), the present method of averaging the values of the axis distance values from the longitudinal axis 320 to the points (343) is preferred as the cylindrical relationship between the axis distance values and the estimated axis distance value better represents the shape of a head. The model may then be formed using the distance values and the estimated distance values assigned to the spatial regions (330).

A surface model may be formed in a number of ways, and is not particularly limited. For example, the surface may be formed using surface fitting or function fitting of the distance values (210). Alternatively the surface may be formed by averaging the values of the distance points allocated to each spatial region. Optionally, the surface may be formed after outlying distance values (210) have been removed from the distance image(s) (130). The surface may be formed after distance values (210) that are further from the longitudinal axis (320) than a threshold value have been removed from the distance image(s) (130). It is also possible for multiple surfaces to be formed. For example, if a user is wearing spectacles, separate surfaces may be formed for the face (110) and the spectacles. A single surface may be formed for the entirety of the face portion (135). Alternatively, smaller surfaces may be formed for a plurality of regions of the face portion (135). These smaller surfaces may subsequently be combined to form a single, larger surface. The regions of the face portion (135) for which smaller surfaces are formed may correspond to the spatial portions (330) defined with respect to the longitudinal axis (320). The regions of the face portion (135) for which smaller surfaces are formed may correspond to subdivided regions of the spatial portions (330). Any other means of forming a surface model may also be used.

However, the three-dimensional model does not need to comprise a surface. The three dimensional model may, for example, comprise a point cloud. The forming of the model may be performed by any other means of forming a model, and is not particularly limited. All steps of the method (10) may be performed on the distance measuring device (120). Alternatively, steps 2 to 6 may be performed on a different computing device, such as by a computer program performed on the server (345) of FIG. 5. The computer program may be stored in the memory of a computer system comprising a processor and said memory.

FIG. 5 is a block diagram showing a technical architecture of a server (345) used to carry out the method above described.

The technical architecture includes a processor (350) (which may be referred to as a central processor unit or CPU) that is in communication with memory devices including secondary storage (360) (such as disk drives), read only memory (ROM) (365), random access memory (RAM) (370). The processor (350) may be implemented as one or more CPU chips. The technical architecture may further comprise input/output (1/O) devices (380), and network connectivity devices (385).

The secondary storage (360) is typically comprised of one or more disk drives or tape drives and is used for non-volatile storage of data and as an over-flow data storage device if RAM (370) is not large enough to hold all working data. Secondary storage (360) may be used to store programs which are loaded into RAM (370) when such programs are selected for execution.

In this embodiment, the secondary storage (360) has an order processing component (360a) comprising non-transitory instructions operative by the processor (350) to perform various operations of the method of the present disclosure. The ROM (365) is used to store instructions and perhaps data which are read during program execution. The secondary storage (360), the RAM (370), and/or the ROM (365) may be referred to in some contexts as computer readable storage media and/or non-transitory computer readable media.

I/O devices (380) may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices (385) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices (385) may enable the processor (350) to communicate with the Internet or one or more intranets. With such a network connection, it is contemplated that the processor (350) might receive information from the network, or might output information to the network in the course of performing the above-described method operations. Such information, which is often represented as a sequence of instructions to be executed using processor (350), may be received from and outputted to the network, for example, in the form of a computer data signal embodied in a carrier wave.

The processor (350) executes instructions, codes, computer programs, scripts which it accesses from hard disk, floppy disk, optical disk (these various disk based systems may all be considered secondary storage (360)), flash drive, ROM (365), RAM (370), or the network connectivity devices (385). While only one processor (350) is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU (350), the RAM (370), and the ROM (365) are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 6:
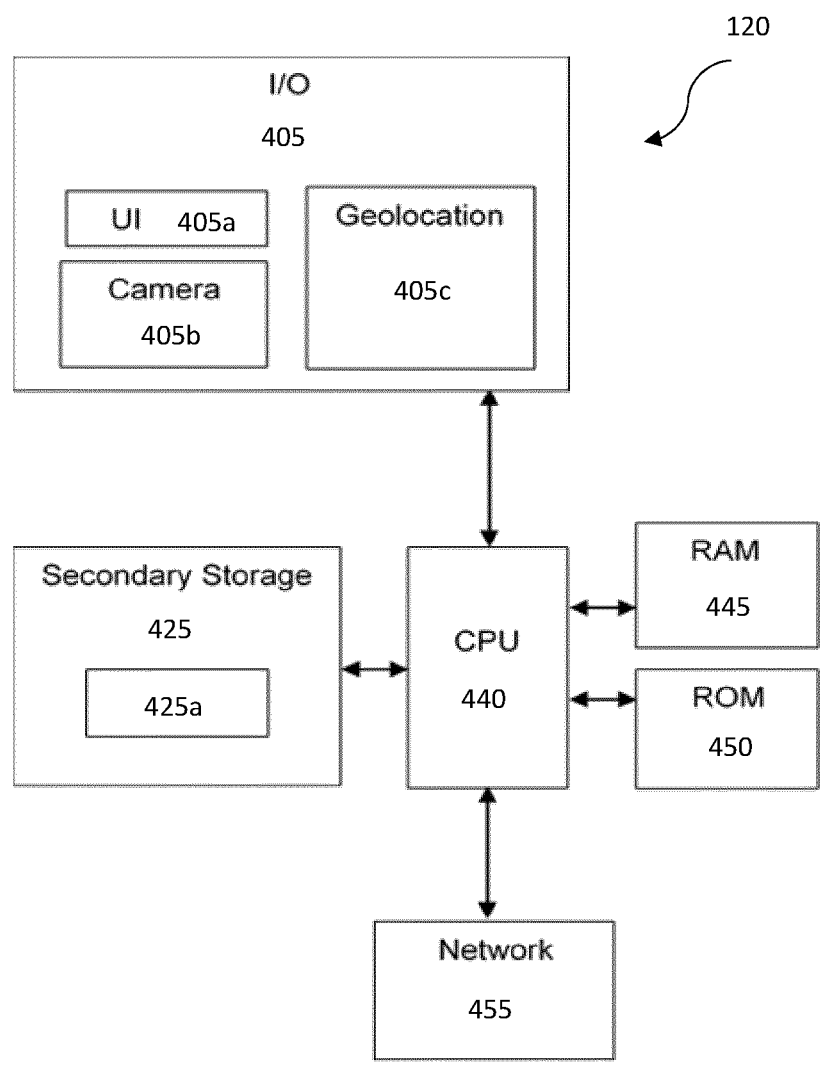
FIG. 6 depicts a block diagram showing a technical architecture of the distance measuring device.

FIG. 6 is a block diagram showing a possible technical architecture of the distance measuring device (120).

The technical architecture includes a processor (440) (which may be referred to as a central processor unit or CPU) that is in communication with memory devices including secondary storage (425) (such as disk drives or memory cards), read only memory (ROM) (450), random access memory (RAM) (445). The processor (440) may be implemented as one or more CPU chips. The technical architecture further comprises input/output (I/O) devices (405), and network connectivity devices (455).

The I/O devices comprise a user interface (UI) (405a), a camera (405b) and a geolocation module (405c). The UI (405a) may comprise a touch screen, keyboard, keypad or other known input device. The camera (405b) allows a user to capture images and save the captured images in electronic form. The geolocation module (405c) is operable to determine the geolocation of the communication device using signals from, for example global positioning system (GPS) satellites.

The secondary storage (425) is typically comprised of a memory card or other storage device and is used for non-volatile storage of data and as an over-flow data storage device if RAM (445) is not large enough to hold all working data. Secondary storage (425) may be used to store programs which are loaded into RAM (445) when such programs are selected for execution.

In this embodiment, the secondary storage (425) has an order generation component (425a), comprising non-transitory instructions operative by the processor (440) to perform various operations of the method of the present disclosure. The ROM (450) is used to store instructions and perhaps data which are read during program execution. The secondary storage (425), the RAM (445), and/or the ROM (450) may be referred to in some contexts as computer readable storage media and/or non-transitory computer readable media.

The network connectivity devices (455) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices (455) may enable the processor (440) to communicate with the Internet or one or more intranets. With such a network connection, it is contemplated that the processor (440) might receive information from the network, or might output information to the network in the course of performing the above-described method operations. Such information, which is often represented as a sequence of instructions to be executed using processor (440), may be received from and outputted to the network, for example, in the form of a computer data signal embodied in a carrier wave.

The processor (440) executes instructions, codes, computer programs, scripts which it accesses from hard disk, floppy disk, optical disk (these various disk based systems may all be considered secondary storage (425)), flash drive, ROM (450), RAM (445), or the network connectivity devices (455). While only one processor (440) is shown, multiple processors may be present. Thus, while instructions may be discussed as executed by a processor, the instructions may be executed simultaneously, serially, or otherwise executed by one or multiple processors.

Whilst the foregoing description has described exemplary embodiments, it will be understood by those skilled in the art that many variations of the embodiment can be made within the scope and spirit of the present invention.

The invention claimed is:

1. A method for generating a three-dimensional model of at least part of a head including at least a part of a face, comprising:
   obtaining a distance image of the head using a distance-measuring device having an imaging position, the distance image comprising for each of a two-dimensional array of distance pixels, a respective distance value indicating a distance from the imaging position to a corresponding point in a field of view of the distance-measuring device, the distance image including a face portion corresponding to the at least part of the face;
   estimating the position, relative to the imaging position, of a longitudinal axis of the model of the head based on at least one dimension of the at least part of the face; and
   generating the three dimensional model of the at least part of the head based on them position of the longitudinal axis.

2. A method according to claim 1, further comprising:
   based on the longitudinal axis, defining a plurality of spatial regions;
   allocating each distance value to a corresponding one of the spatial regions; and
   for each spatial region to which one or more distance values have been allocated, generating a corresponding portion of the three-dimensional model of the head based on the distance values allocated to that spatial region.

3. A method according claim 2, wherein at a plurality of positions along the longitudinal axis a respective first plurality of the spatial regions extend from that position along the longitudinal axis orthogonally to the longitudinal axis and subtend respective angles about the axis.

4. A method according to claim 2, wherein for a crown point on the longitudinal axis, a second plurality of the spatial regions extend in a direction away from the crown point at respective angles inclined to the longitudinal axis and subtending corresponding solid angles about the crown point.

5. A method according to claim 2, further comprising:
determining which of the spatial regions contain at least one distance value obtained from at least one distance image;
determining the face portion by finding the largest connected group of spatial regions that contain at least one distance value, wherein a spatial region is considered to be connected to another spatial region if it is adjacent to that spatial region; and
deleting any distance values which are not part of the face portion.

6. A method according to claim 2, further comprising:
identifying a spatial region for which no distance values have been allocated;
identifying whether any adjacent spatial regions have been allocated distance values;
converting any distance values allocated to adjacent spatial regions into axis distance values, wherein axis distance values define a distance in three-dimensional space from the longitudinal axis; and
calculating an estimated axis distance value for the spatial region for which no distance values have been allocated based on the axis distance values of the adjacent regions.

7. A method according to claim 1, wherein the distance measuring device is also an electromagnetic radiation image capturing device, the method further comprising capturing a two-dimensional electromagnetic radiation image of the at least part of the face using the electromagnetic radiation image capturing device, the electromagnetic radiation image including a face portion of the electromagnetic radiation image corresponding to the at least part of the face.

8. A method according to claim 7, wherein the electromagnetic radiation image is a visual image.

9. A method according to claim 7, further comprising a step of identifying the at least one dimension of the at least part of the face based on the face portion of the electromagnetic radiation image.

10. A method according to claim 7, further comprising defining a colour of one or more portions of the three dimensional model of at least part of the head based on the electromagnetic radiation image.

11. A method according to claim 1, further comprising a step of identifying the at least one dimension of the at least part of the face based on the face portion of the distance image.

12. A method according to claim 11, further comprising a step of identifying the at least one dimension of the at least part of the face based on the face portion of the electromagnetic radiation image; and in which the electromagnetic radiation image is used to identify points on the at least part of the face, corresponding points are found in a three dimensional space of the distance image, and the dimension is defined as the distance in three dimensional space between the identified points in the three-dimensional space of the distance image.

13. A method according to claim 1, wherein the step of identifying at least one dimension of the at least part of the face is based on data input by a user or data retrieved from a database.

14. A method according to claim 1, wherein the step of estimating the position of a longitudinal axis comprises multiplying the dimension of the at least part of the face by at least one predefined physiognomy ratio.

15. A method according to claim 1, further comprising:
obtaining an additional distance image comprising additional distance values, wherein the positional relationship between the distance-measuring device and the at least part of a head when obtaining the additional distance image is different from the positional relationship between the distance-measuring device and the at least part of a head when obtaining an original distance image; and
optionally repeating the above steps of obtaining an additional distance image, wherein the positional relationship between the distance-measuring device and the at least part of a head is changed for each repetition of the steps.

16. A method according to claim 15, further comprising:
performing alignment of the original distance image and the additional distance image; and
calculating an angle of rotation of the at least part of the face between the original distance image and the additional distance image with respect to the longitudinal axis.

17. A method according to claim 1, wherein the distance-measuring device is a mobile telephone.

18. A method according to claim 7, further comprising fabricating an item of face wear based on the three-dimensional model of the head.

19. A method according to claim 1, further comprising producing, based on the three-dimensional model of the head, a mask for providing a gas supply to a user.

20. A method according to claim 19, wherein the mask for providing a gas supply is for treating sleep apnoea.

21. A non-transitory computer readable medium storing a computer program for generating a three-dimensional model of a head including at least a part of a face, when executed by a computer, comprising instructions to:
receive a distance image of the head from a distance-measuring device having an imaging position, the distance image comprising for each of a two-dimensional array of distance pixels, a respective distance value indicating a distance from the imaging position to a corresponding point in a field of view of the distance-measuring device, the distance image including a face portion corresponding to the at least a part of a face;
estimate the position, relative to the imaging position, of a longitudinal axis of the model of the head based on at least one dimension of the face; and
generate the three dimensional model of the head based on the position of the longitudinal axis.

22. A computer system comprising a processor and a memory storing a computer program according to claim 21, wherein the processor is operative to run the computer program.

* * * * *